United States Patent [19]

Youngblood, Jr.

[11] 3,924,764

[45] Dec. 9, 1975

[54] RETRACTABLE OVERHEAD CARRIAGE FOR CARRYING CARGO ATOP A VEHICLE

[76] Inventor: Hugh A. Youngblood, Jr., 3225 N. Virginia, Oklahoma City, Okla. 73118

[22] Filed: Nov. 5, 1973

[21] Appl. No.: 413,041

[52] U.S. Cl................................ 214/450; 214/85.1
[51] Int. Cl.².......................................... B60R 9/00
[58] Field of Search ....... 214/450, 85.1, 85; 212/55; 224/42.1 H

[56] References Cited
UNITED STATES PATENTS

| | | | |
|---|---|---|---|
| 2,715,974 | 8/1955 | VanNest | 214/450 |
| 2,765,940 | 10/1956 | Nelson | 214/450 |
| 3,169,653 | 2/1965 | Stromberg | 214/450 |
| 3,193,124 | 7/1965 | Essling | 214/450 |
| 3,480,109 | 11/1969 | Eitel et al. | 212/55 |
| 3,495,729 | 2/1970 | Kruse | 214/450 |

Primary Examiner—Robert J. Spar
Assistant Examiner—Ross Weaver
Attorney, Agent, or Firm—Laney, Dougherty, Hessin & Fish

[57] ABSTRACT

A retractable overhead carriage adapted to be mounted atop a flat top vehicle such as a camper or travel trailer, the carriage including a pair of fixed supporting rails adapted for mounting atop the vehicle and for extending transversely thereacross; a pair of elongated U-shaped channel rails slidably mounted on the fixed supporting rails for transverse movement thereon; a chain and sprocket assembly mounted adjacent one end of one of the fixed supporting rails and drivingly connected to the U-shaped channel rails for driving the U-shaped channel rails in reciprocating sliding movement on the fixed supporting rails, and an arrestor arm assembly connected between each of said U-shaped channel rails and the respective fixed supporting rail upon which each U-shaped channel rail is slidably mounted for arresting pivotal movement of each of said channel rails about a horizontal axis after the respective channel rail has moved horizontally on its respective supporting rail to a predetermined location. Cargo is secured to the overhead carriage by fastening it to the U-shaped channel rails at a time when they are displaced laterally with respect to the vehicle carrying the carriage and are extended in a substantially vertical direction alongside the vehicle. The channel rails, with the cargo affixed thereto, are then cranked upwardly and laterally through an arcuate path of movement until they slidingly engage the upper sides of the supporting rails, and are then shifted transversely on the supporting rails until the channel rails and cargo carried thereby are directly over a vehicle carrying the carriage.

12 Claims, 11 Drawing Figures

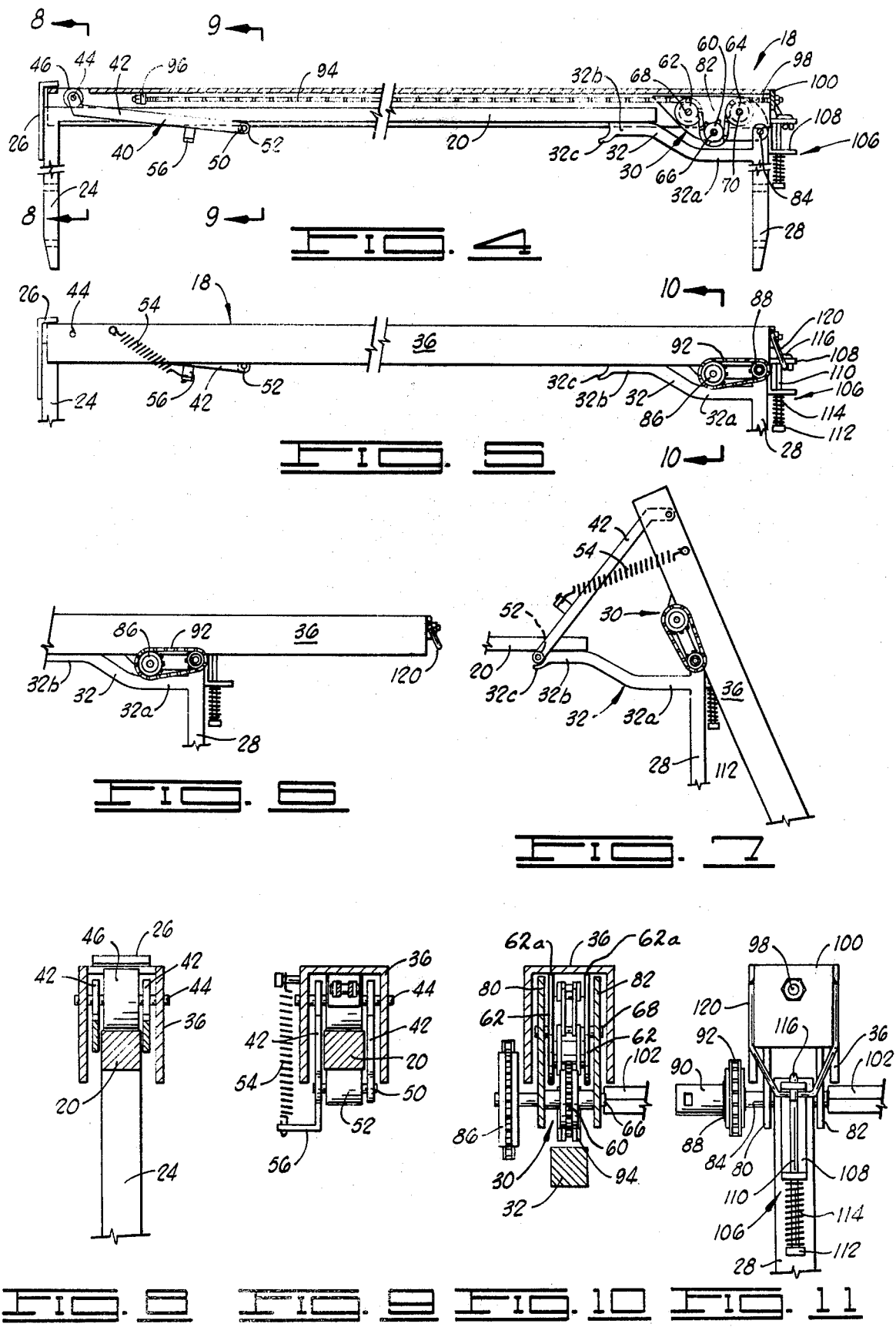

RETRACTABLE OVERHEAD CARRIAGE FOR CARRYING CARGO ATOP A VEHICLE

BACKGROUND OF THE INVENTION

1. Field of the Invention

This invention relates to cargo racks and carriages mountable atop a vehicle, and being retractable from the top of the vehicle to a position where cargo can be more easily secured to the carriage or rack, and then returnable to a position over the vehicle by means of a mechanical cranking system.

2. Brief Description of the Prior Art

Various types of cargo carriages and racks have heretofore been proposed for mounting atop vehicles such as campers or travel trailers, and more recently, it has been proposed to make certain parts of these carriage assemblies movable so that a cargo retaining or carrying portion thereof can be shifted laterally and downwardly to provide better access to this portion of the apparatus for the securement of cargo thereto. This cargo carrying part of the apparatus is then returned to a position on top of the vehicle where it is secured in a transport position. Such carriage systems have frequently been particularly well adapted for carrying boats and other heavy cargo which is mounted to extend fore and aft or from front to rear on the vehicle on which it is to be supported, and which, because of the bulk and size of the cargo, require a plurality of supporting structural members. Many of the systems which have been proposed for the purpose described have been complicated and expensive, and have included tracks and racks mounted on the side of the vehicle, as well as on top thereof, detracting from the aesthetic appearance of the vehicle by the inclusion of such laterally placed vertically extending tracks. In other instances, complicated cable and pulley systems have been employed which are susceptible to malfunction after short periods of usage.

Among the prior systems which have been evolved for the purposes described, some have been made the subjects of United States Letters Patent, and these include, for example, Swenson U.S. Pat. No. 2,551,351; Ingram U.S. Pat. No. 2,396,804; Van Nest U.S. Pat. No. 2,715,974; Permut et al U.S. Pat. No. 3,720,334; Roux U.S. Pat. No. 3,186,569; and Raypholtz U.S. Pat. No. 3,521,774.

BRIEF DESCRIPTION OF THE PRESENT INVENTION

The present invention provides an improved retractable overhead carriage for carrying heavy, bulky cargo atop a vehicle, such as a camper or travel trailer. The carriage of the invention is compact in its travel status and can be easily expanded to a status in which the cargo is moved from atop of the vehicle to the side thereof within easy reach of a person wishing to change the cargo, or unload it.

Broadly described, the overhead carriage of the present invention comprises a pair of elongated, spaced supporting rails each having, for the purpose of spacing the rail above the top or roof of a camper or other vehicle, a pair of side posts disposed at the opposite sides of the vehicle, with one of the side posts connected to one end of the respective supporting rail and the other side post being connected through a generally S-shaped end member to the other end of the respective supporting rail. A pair of elongated, U-shaped movable channel rails are movably mounted on each of the supporting rails for axial movement therealong in a direction transverse with respect to the vehicle body upon which the carriage is mounted. Pivotally connected to the upper end of each of the side posts which is connected through the S-shaped end member to one end of one of the supporting rails is a sprocket and chain assembly. The sprocket and chain assembly in each case includes a drive sprocket and a chain which has its ends connected to opposite ends of the respective adjacent movable channel rail so that rotation of the sprocket will cause the respective channel rail to move axially along the supporting rail upon which it is movably mounted.

Adjacent one end of each of the U-shaped channel rails are a pair of arresting arms which are connected at one end to the channel rail, and which extend beneath the respective supporting rail at a transversely spaced location and carry a roller which rollably engages the under side of the respective supporting rail. Each of the arrestor arms is further connected to the respective movable channel rail with which it is associated by a pair of arrestor arm return springs. Suitable hold down means are provided at the upper ends of each of the side posts for the purpose of engaging the U-shaped movable channel rails at a time when they are in their cargo-loaded, traveling status in superimposed relation to the supporting rails.

In the use of the retractable overhead cargo carriage of the invention, a crank or other suitable device is used for engaging and rotating a drive sprocket in the sprocket and chain assemblies and thereby cause a lateral or sideways movement of the U-shaped movable channel rails in relation to the stationary supporting rails. When the channel rails move to a certain point in their transverse travel, they commence, under the influence of gravity, to pivot downwardly about a horizontal, pivotal axis formed by the point of pivotal connection of each of the chain and sprocket assemblies to the respective side post upon which it is supported. This downward pivotation of the channel rails brings them to an accessible position alongside the vehicle upon which the retractable carriage is mounted so that heavy cargo can then be secured to the channel rails without having to use a ladder or some other means to obtain access to the supporting structure while it is still on top of the vehicle. The movement of the channel supporting rails is reversed by means of the sprocket and chain assemblies after the cargo has been mounted thereon, and the channel rails can be caused to return to their position in which they are supported directly by the fixed supporting rails secured to the top of the vehicle.

An important object of the present invention is to provide a retractable overhead carriage which is relatively simple in construction and mechanism, has relatively few moving parts as compared to many of the generally similar types of assemblies heretofore provided, and which is characterized in having a long and trouble-free operating life.

Another object of the invention is to provide a retractable overhead carriage in which the load carrying, cargo supporting structural elements can be easily moved to a position where they are accessible for securing the cargo thereto, and then, with a heavy cargo affixed to these members, can be easily returned to the transport, stored position.

Additional objects and advantages of the invention will become apparent as the following detailed description of the invention is read in conjunction with the accompanying drawings which illustrate the invention.

BRIEF DESCRIPTION OF THE DRAWINGS

FIG. 4 is a sectional view taken along line 4—4 of FIG. 3.

FIG. 5 is a side elevation view of the forward portion of the retractable carriage of the invention illustrating, in elevation, certain structural elements, including side posts adapted for securement to the side of a vehicle, one of the U-shaped movable channel rails and one of the chain and sprocket assemblies, and hold down means used for securing the movable channel rail in place.

FIG. 6 is an enlarged detail view of the right side of the structure depicted in FIG. 5, but illustrating the commencement of the retractive movement of the movable channel rail as it moves toward a cargo loading position.

FIG. 7 is a view similar to FIG. 6, but illustrating the status of the movable channel rail at a time when it is fully retracted and in its cargo loading position alongside the vehicle upon which the retractable carriage of the invention is mounted.

FIG. 8 is a sectional view taken along line 8—8 of FIG. 4.

FIG. 9 is a sectional view taken along line 9—9 of FIG. 4.

FIG. 10 is a sectional view taken along line 10—10 of FIG. 5.

FIG. 11 is a side elevation, enlarged detail view showing the appearance of the hold down structure attached to one end of one of the movable channel rails, a portion of one of the chain and sprocket assemblies, and an end of one of the movable channel rails.

DETAILED DESCRIPTION OF A PREFERRED EMBODIMENT OF THE INVENTION

Figure 1:
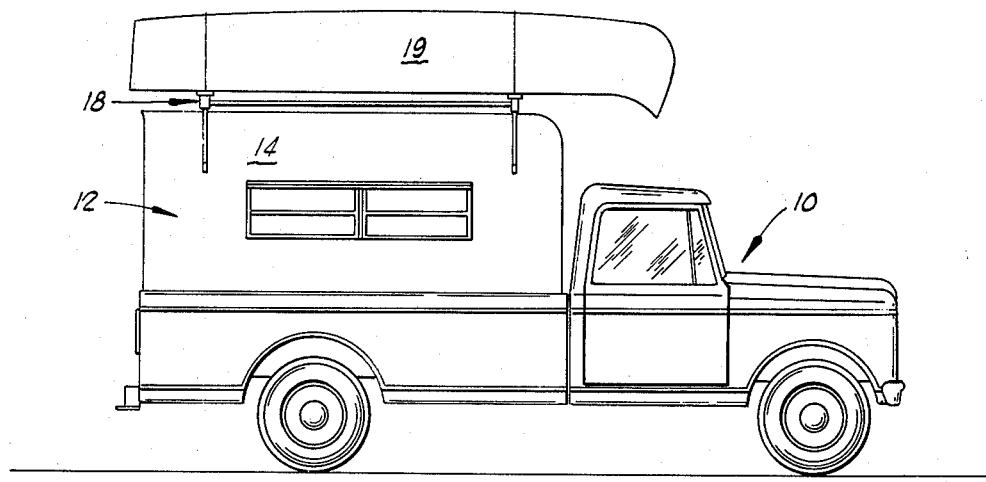
FIG. 1 illustrates a vehicle having cargo mounted in a travel position atop the vehicle and supported on, and secured by, the retractable overhead carriage of the present invention.
Figure 2:
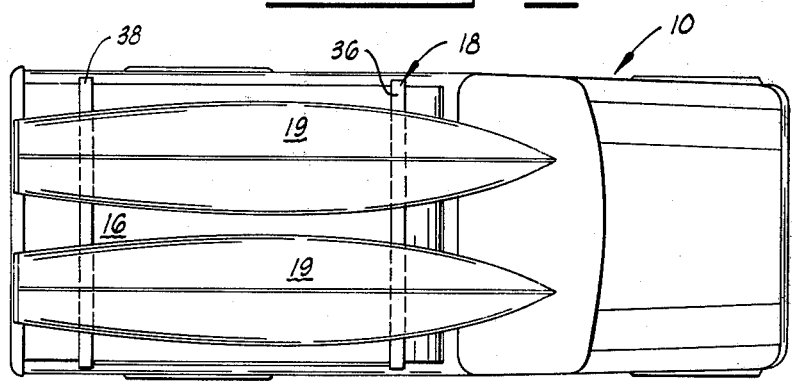
FIG. 2 is a plan view of the vehicle, cargo and carriage of the present invention.
Figure 3:
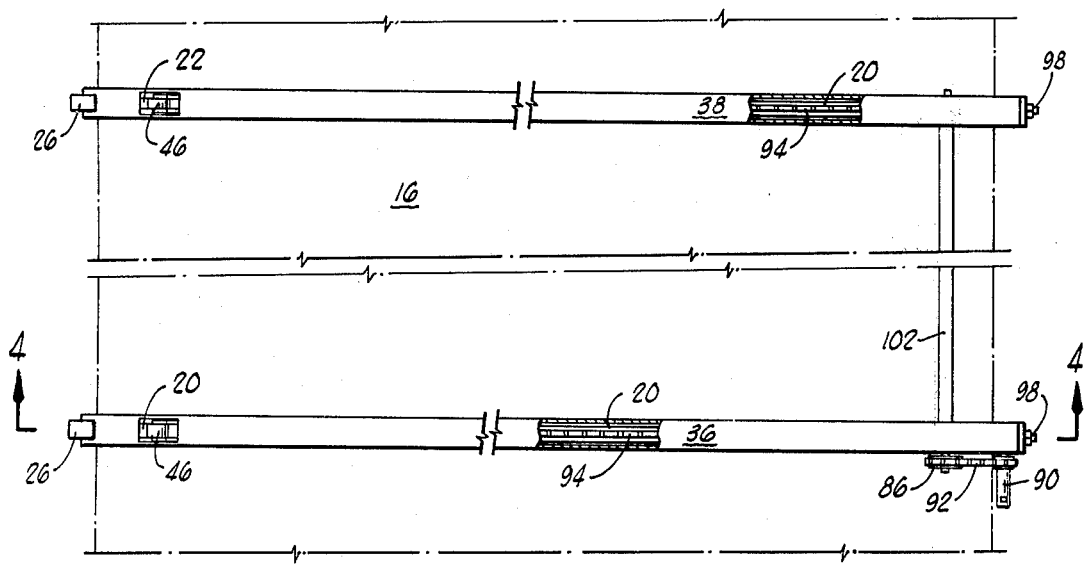
FIG. 3 is a plan view of the retractable carriage of the present invention, showing particularly the appearance of the movable channel rails constituting the cargo or load bearing members at a time when the cargo has been removed therefrom.

Referring initially to FIG. 1 of the drawings, shown therein is a truck 10 having a camper housing 12 mounted in the bed thereof. As is conventional in the construction of such campers, the camper housing is a substantially rectangular cross sectional structure and includes side walls 14 and a flat roof or top 16 (see FIG. 2). The retractable overhead carriage of the present invention is mounted over the roof of the camper, and is designated generally by reference numeral 18. For illustrative purposes, the retractable overhead carriage of the invention is depicted as in use for supporting and carrying, in a transport position, a pair of elongated canoes 19.

The structure of the retractable overhead carriage 18 is illustrated in detail in FIGS. 3-11. The carriage 18 includes a pair of elongated, spaced supporting rails or rods 20 and 22 which extend transversely across the camper 12 and are spaced above the roof 16 thereof. The supporting rods 20 and 22 may be variously constructed, but in a preferred embodiment of the invention, are hollow, rectangularly cross-sectioned tubular members as best illustrated in FIGS. 8–10. Solid bar stock may also be used, and the cross section of these members may also be circular.

For the purpose of supporting each supporting rod 20 and 22 in a horizontally extending position above the top 16 of the camper 12, a side post 24 is provided and is secured to one side 14 of the cammper 12. Each of the side posts 24 is secured at its upper end to one of the supporting rods 20 and 22, and each of the side posts 24 carries an upwardly projecting, turned over retainer bracket 26. At the opposite side of the camper 12, a pair of side posts 28 are secured to the side wall 14 of the camper, and each projects vertically to a point of pivotal connection to a chain and sprocket assembly designated generally by reference numeral 30. The details of construction of each of the chain and sprocket assemblies will be hereinafter described.

Projecting laterally from each of the side posts 28 at a position over the camper 12 is an S-shaped end member 32. The S-shaped end member 32 is configured to have a lower leg 32a which bears against the top or roof 16 of the camper 12 and an upper leg 32b which terminates in a downwardly and horizontally projecting arrestor hook 32c and is secured to the end of one of the supporting rails which is opposite that end of the rail connected to the respective side post 24. This relationship of the S-shaped end member to the respective supporting rail is best illustrated in FIG. 4 of the drawings.

Movably mounted over each of the supporting rails 20 and 22 is an elongated channel rail. The channel rails are each of U-shaped cross section and are designated by reference numerals 36 and 38. In order to facilitate the axial movement of each of the channel rails 36 and 38 along its respective supporting rail 20 or 22, an arresting arm assembly 30 is provided in association with each of the channel rails and its respective supporting rod. Each of the arresting arm assemblies 30 includes a pair of elongated, spaced, substantially parallel extending arrestor arms 42 which are disposed on opposite sides of the respective supporting rod, and which have one end portion projecting up into the respective channel rail between the opposed side flanges thereof, as best illustrated in FIGS. 8 and 9 of the drawings.

At their ends which project up into the respective channel rail, the arrestor arms 42 are interconnected by a pivot pin 44 which projects through the arrestor arms and through aligned or registering apertures formed in the side flanges of the respective channel rail with which the arresting arm assembly is associated. This relationship is best illustrated in FIGS. 8 and 9 of the drawings. At a central point on the pivot pin 44, and located between the two arrestor arms 42, is a roller 46 which is free to roll about the horizontal axis constituted by the pivot pin, either by rolling on the pivot pin, or by the pivot pin rolling or turning within the respective apertures which receive it as it passes through the arrestor arms 42 and the side channels of the respective channel rail. The roller 46 is thus free to roll against the top surface of the respective supporting rod 20 or 22 with which it is in contact when the retractable carriage is in its transport, cargo storing position.

At the opposite ends of the arrestor arms 42 from their ends which carry the roller 46 and project into the respective channel rail, each pair of the arrestor arms carries a second pivot pin 50 which is extended between registering apertures or holes formed in the arrestor arms, and which carries a roller 52. The roller 52 rollably contacts the lower side of the respective supporting rail 20 or 22 in the manner illustrated in FIG. 9.

Each of the arresting arm assemblies 40 further includes an elongated helical spring 54 which has one of its ends connected to the respective channel rail 36 or 38 at a point spaced well inwardly along the channel rail from the point of securement thereto of the pivot pin 50, and which has its other end secured to a spring connector finger 56 projecting from one of the arrestor arms 42 relatively closely adjacent the end thereof which, in cooperation with the corresponding end of the second arrestor arm, carries the roller 52. The helical springs 54, when thus oriented and connected, function, in part, to hold the arrestor arms 42 in the positions illustrated in FIG. 4 at a time when the channel rails extend horizontally and directly overlie the respective supporting rails 20 and 22. This places the arrestor arms in a position to aid in guiding the movement of the channel rails on the respective supporting rails, and also causes the roller 52 to track along the lower side of the respective supporting rods.

Each of the chain and sprocket assemblies 30 is similarly constructed and includes a drive sprocket 60 and a pair of idler sprocket rollers 62 and 64. The drive sprocket, as well as each of the idler sprocket rollers 62 and 64 in each of the chain and sprocket assemblies 30, is mounted for rotation about a horizontal axis on a suitable sprocket shaft. The sprocket shaft which supports the drive sprocket 60 is designated by reference numeral 66 and those rotatably supporting the idler sprocket rollers are designated by reference numerals 68 and 70. The shafts 66, 68 and 70 extend between a pair of supporting plates 80 and 82 as best shown in FIGS. 4 and 10. At one end, the two supporting plates 80 and 82 are mounted and secured by means of a pivot pin 84 to the upper end of the side post 28.

It should be pointed out that each of the idler sprocket rollers is of a sheave-like construction with the teeth of the sprocket being positioned between a pair of flanges which project radially beyond the teeth and form a roller which contacts the web portion of the respective channel rail in which each chain and sprocket assembly 30 is located (as shown by reference numeral 62a in FIG. 10). In other words, the supporting plates 80 and 82 of each chain and sprocket assembly 30 project into the interior of the respective movable channel rail 36 or 38, and the outer peripheral surfaces of the idler sprocket rollers 62 and 64 carried in each arresting arm assembly project higher than the top edges of the respective supporting plates 80 and 82 in which they are mounted so as to form rolling surfaces in contact with the web portions of the respective channel rail associated with each of the arresting arm assemblies (see FIG. 10).

The forward chain and sprocket assembly 30, illustrated in FIGS. 4 and 5, is drivingly connected by an extension of the sprocket shaft 66 to a transmission sprocket 86 carried outside the channel rail 36 as best illustrated in FIG. 5. The transmission sprocket 86 is driven by a sprocket 88 which can suitably be rotatably mounted on an extended end portion of the pivot pin 84. Secured to one side of the sprocket 88 is a drive hub 90 having a bore extending thereinto, which bore may suitably be polygonally cross-sectioned or otherwise adapted to key with, or engage, a hand crank insertable into the bore. Rotation of the drive hub 90 by means of such hand crank results in the rotation of the sprocket 88 which, by means of a suitable connecting chain 92, drives the transmission sprocket 86 in rotation. (See FIGS. 5 and 11)

A pair of elongated flexible chains 94 are provided, with one of such chains being associated with each chain and sprocket assembly 30 and with each of the movable channel rails 36 and 38. The elongated flexible chain 94 is, in each case, connected at one of its ends to the web portion of one of the respective channel rails 36 and 38 near one end of the rail, as shown by reference numeral 96 in FIG. 3, and is connected at its other end to a suitable threaded tensioning screw 98 extended through an end plate 100 secured across and closing the opposite open end of the respective channel rail (See FIGS. 4 and 11). Intermediate the length of each of the chains 94, each chain is passed over the drive sprocket 60 and the two idler sprockets 62 and 64 in each of the chain and sprocket assemblies 30. The manner in which the chain is passed over these sprockets is best illustrated in FIG. 4 of the drawings.

For the purpose of permitting the chain and sprocket assembly 30 associated with the rearmost movable channel rail 38 to be driven from the chain and sprocket assembly associated with the forwardmost channel rail 36, the sprocket shafts 66 of the two chain and sprocket assemblies 30 are interconnected through an elongated drive shaft 102. Thus, as the drive sprocket 60 in the forward assembly is driven in rotation by means of a crank as hereinbefore described, the corresponding drive sprocket carried on the rear chain and sprocket assembly is also driven in rotation.

A latching mechanism, designated generally by reference numeral 106 is secured to the outwardly facing side of the side post 28 near the upper end thereof, and functions for latching and retaining the movable channel rails 36 and 38 in their transport position as depicted in FIGS. 4 and 5. The details of construction of the latching assembly 106 are best illustrated in FIGS. 4, 5 and 11. As here shown, the latching assembly 106 includes a U-shaped bracket 108 welded or otherwise suitably secured to the outer face of the side post 28, and having a pair of registering apertures or holes formed through the parallel legs of the bracket. An elongated retainer hook 110 is extended through these registering holes and carries at its lower end, a head 112 which forms an abutment against which one end of a helical spring 114 bears. The top end of the spring 114 bears against one of the legs of the bracket 108. At its upper end, the hook 110 is turned over to form a generally U-shaped hook portion 116, and the free end of the hook is positioned to extend downwardly through another hole in the top one of the parallel legs of the bracket 108. The hook portion 116 is positioned for engagement with the bight portion of a generally U-shaped retainer rod 120 which is welded, or otherwise suitably secured, to the end plate 100 attached to the end of the channel rail 36, and is dimensioned to pass around and beneath the top one of the parallel legs of the bracket 108 as shown in FIGS. 4, 5 and 11.

Operation

In the use and operation of the retractable overhead carriage 18 of the invention, a suitable crank is first employed for insertion in the crank hub 90 to thereby effect rotation of the sprocket 88, and by means of this sprocket, to drive the drive sprocket 60 and idler sprockets 62 and 64 of the two chain and sprocket assemblies 30. As the drive sprockets 60 are driven in rotation, the position of the respective elongated chain 94 in relation to the sprockets which it traverses is changed so that a shorter length of the chain extends on one side of the sprocket to the respective end of the movable channel rails 36 or 38 than was previously the case prior to commencement of the cranking motion. The net effect of the rotation of the drive sprockets 60 in each of the two chain and sprocket assemblies 30 is to cause the movable channel rails 36 and 38 to undergo movement relative to the supporting rods 20 and 22 in an axial direction with respect to the supporting rods. The channel rails 36 and 38 will commence to move toward the right, as they are viewed in FIGS. 5 and 6, provided, of course, that the latching assembly 106 has been unlatched from the status shown in FIGS. 4 and 5. As the movable channel rails 36 and 38 move along the respective supporting rails 20 and 22, their movement is guided by the tracking of the rollers 46 and 52 on the respective supporting rods 20 and 22.

At some point during the lateral movement of the channel rails 36 and 38, the cantilevered orientation of the channel rails becomes such that the weight of the outwardly projecting ends of these rails causes them to commence to pivot downwardly from the horizontal position shown in FIG. 6 toward the generally vertically extending status shown in FIG. 7. As the channel rails undergo such pivotation, the chain and sprocket assemblies 30 are free to pivot with the channel rails in the manner illustrated in FIG. 7. After the channel rails 36 and 38 have pivoted downwardly to a certain point, their further movement is arrested by reason of the engagement of the rollers 52 by the arrestor hooks 32c carried at the ends of the two S-shaped end members 32. This status is depicted in FIG. 7.

After the movable channel rails 36 and 38 have been moved to the downwardly extending positions illustrated by the position of the channel rail 36 in FIG. 7, a cargo to be carried on the carriage of the invention can be secured across the two channel rails preparatory to elevating the channel rails and cargo to the transport position. Thus, a pair of canoes, for example, can be secured across the two channel rails 36 and 38 in the manner depicted in FIG. 2 of the drawings, and this can be done while the channel rails extend downwardly alongside the camper 14. When the canoes, or other cargo, have been secured to the rails, the crank is used for reversing the direction of rotation of the two drive sprockets 60 in the chain and sprocket assemblies 30. This will cause the channel rails 36 and 38 to be moved upwardly until a point where, by gravitational action and by action of the helical springs 54 and also the limiting effect of the arresting arms 42, the channel rails are caused to start pivoting toward a horizontally extending position. After reaching the horizontal status, the channel rails are then caused to move transversely in a horizontal plane and in a superimposed relation with respect to the supporting rods 20 and 22. Finally, the channel rails will assume the status depicted by the channel rail 36 in FIG. 5. The latching assembly 106 can then be relatched in the manner depicted in FIG. 4, so that, in cooperation with the retainer bracket 26, the channel rails are firmly retained in their horizontally extending, transport status.

Although certain preferred embodiments of the present invention have been herein described in order to illustrate the principles which underlie the invention, it will be understood that various changes and modifications in the illustrated and described structure can be effected without departure from the basic principles which underlie the invention. Changes and innovations of this type are therefore deemed to be circumscribed by the spirit and scope of the invention except as the same may be necessarily limited by the appended claims or reasonable equivalents thereof.

What is claimed is:

1. A retractable overhead carriage adapted to be mounted atop a vehicle comprising:
   a plurality of elongated fixed supporting rails;
   means for mounting the supporting rails in spaced, horizontally extending positions atop a vehicle;
   a plurality of elongated movable rails each movably mounted on one of said supporting rails for horizontal movement thereon;
   a chain and sprocket assembly connected to each of said movable rails and each including:
     a chain having its opposite ends connected to the respective movable rails at points spaced horizontally therealong;
     a sprocket drivingly engaging the chain intermediate its length; and
     means rotatingly supporting the sprocket and pivotally connectable to said vehicle to facilitate pivotation of the respective chain and sprocket assembly and its respective movable rail about a horizontal axis; and
   means for arresting the movement of the movable rails about said horizontal axis, said arresting means comprising:
     an elongated arrestor arm having one end thereof pivotally connected to one of said movable rails; and
     a first roller carried on the other end of said arrestor arm rollingly engaging the underside of one of said supporting rails below said one movable rail at a location horizontally displaced from the point of pivotal connection of said arrestor arm to said one movable rail; and
     means for engaging said roller and arresting further rolling movement thereof along said one supporting rail at a time after said movable rail has undergone pivotal movement about said horizontal axis.

2. A retractable overhead carriage as defined in claim 1 wherein a plurality of said arresting means are provided, each of said arresting means being connected through its respective arresting arm to a different one of said movable rails.

3. A retractable overhead carriage adapted to be mounted atop a vehicle comprising:
   a plurality of elongated, fixed supporting rails;
   means for mounting the supporting rails in spaced, horizontally extending positions atop a vehicle;
   a plurality of spaced, elongated, movable rails, each movably mounted on one of said supporting rails for horizontal movement thereon;
   a chain and sprocket assembly connected to each of said movable rails and including:
     a chain having its opposite ends connected to the respective movable rail at two points spaced horizontally therealong;
     a sprocket drivingly engaging the chain intermediate its length;
     idler sprocket roller means supporting the chain to extend in a substantially linear path between said two points, with said linear path extending parallel to the respective movable rail;

means rotatably supporting the sprocket and idler sprocket roller means and pivotally connectable to said vehicle to facilitate pivotation of the respective chain and sprocket assembly and its respective movable rail about a horizontal axis which is stationary with respect to said vehicle and said fixed supporting rails;

a pivot pin extending through said means rotatably supporting the sprocket and idler sprocket roller means and adapted for connecting said means rotatably supporting the sprocket and idler sprocket roller means to said vehicle, said pivot pin extending along said horizontal axis which is stationary with respect to said vehicle and fixed supporting rails;

a drive sprocket mounted on said pivot pin for rotation about said horizontal axis;

a chain interconnecting said drive sprocket and said first-mentioned sprocket for driving said first-mentioned sprocket from said drive sprocket;

a drive hub connected to said drive sprocket in alignment with said pivot pin and said horizontal axis and adapted to receive a crank for cranking said drive sprocket in rotation whereby said crank can be retained in one location while said drive sprocket is driven in rotation to cause said spaced, elongated movable rails to move from over the vehicle by reciprocation on said fixed supporting rails.

4. A retractable overhead carriage as defined in claim 3 and further characterized as including means for latching said movable rails in a horizontal position superimposed immediately over said supporting rails.

5. A retractable overhead carriage as defined in claim 3 and further characterized as including power transmission means interconnecting said sprockets whereby the chains of said chain and sprocket assemblies are concurrently driven from a common power source.

6. A retractable overhead carriage as defined in claim 3 wherein each of said movable rails is a channel rail of C-shaped cross-section, and wherein said carriage is further characterized as including a roller mounted in each of said channel rails and rollingly contacting the upper side of one of said supporting rails.

7. A retractable overhead carriage as defined in claim 3 wherein there are a pair of said supporting rails extending parallel to each other, and a pair of said movable rails movably mounted over and supported on the supporting rails.

8. A retractable overhead carriage adapted to be mounted atop a vehicle comprising:

a pair of elongated, fixed supporting rails extending parallel to each other;

means for mounting the supporting rails in spaced, horizontally extending positions atop a vehicle;

a pair of elongated, movable rails each movably mounted over and supported on one of said fixed supporting rails for horizontal movement thereon;

a chain and sprocket assembly connected to each of said movable rails and each including:

a chain having its opposite ends connected to the respective movable rail at points spaced horizontally therealong;

a sprocket drivingly engaging the chain intermediate its length; and means rotatably supporting the sprocket and pivotally connectable to said vehicle to facilitate pivotation of the respective chain and sprocket assembly and its respective movable rail about a horizontal rails; and means for arresting the pivotal movement of the movable rails about said horizontal axis, said arresting means comprising:

a first pair of substantially parallel arrestor arms each pivotally connected at one end to one of said movable rails near one end thereof;

a first roller rotatably mounted between the other ends of the arrestor arms in said first pair of arrestor arms for rotation about a horizontal axis, and in rolling contact withthe lower side of the supporting rail underlying said one movable rail;

a second pair of substantially parallel arrestor arms each pivotally connected at one end to the other one of said movable rails near one end thereof; and a second roller rotatably mounted between the other ends of the arrestor arms in said second pair of arrestor arms for rotation about a horizontal axis, and in rolling contact with the lower side of the other supporting rail underlying said other movable rail.

9. A retractable overhead carriage as defined in claim 8 and further characterized as including an arrestor hook secured to the underside of each of said supporting rails and positioned for engagement with said rollers after they have traveled along the lower sides of said supporting rails to a predetermined point.

10. A retractable overhead carriage as defined in claim 8 wherein said means for arresting the movement of said movable rails further comprises:

a first spring having one end connected to said one movable rail at a point spaced therealong from the points of connection thereto of the arrestor arms in said first pair of arrestor arms, and having its other end connected to one of the arrestor arms in said first pair at a location between the ends of said one arrestor arm in said first pair; and a second spring having one end connected to the other of said movable rails at a point spaced therealong from the points of connection thereto of the arrestor arms in said second pair of arrestor arms, and having its other end connected to one of the arrestor arms in said second pair at a location between the ends of said one arrestor arm in said second pair.

11. A retractable overhead carriage adapted to be mounted atop a vehicle comprising:

a plurality of elongated, fixed supporting rails;

means for mounting the supporting rails in spaced, horizontally extending positions atop a vehicle;

a plurality of spaced elongated movable rails each movably mounted on one of said supporting rails for horizontal movement thereon;

a chain and sprocket assembly connectedto each of said movable rails and each including:

a chain having its opposite ends connected to the respective movable rails at points spaced horizontally therealong;

a first sprocket drivingly engaging the chain intermediate its length;

means rotatingly supporting the first sprocket and pivotally connectable to said vehicle to facilitate pivotation of the respective movable rail about a horizontal axis; and additional sprockets on opposite sides of said first sprocket, engaging the chain intermediate its length and rotatably mounted in said means rotatably supporting said first sprocket, said additional sprockets each having circular peripheral flange portions which project radially beyond the teeth of the respective additional sprocket and rollably engage the underside of the respective movable rail connected to the respective chain and sprocket assembly.

12. A retractable overhead carriage adapted to be mounted atop a vehicle comprising:

a plurality of elongated, fixed supporting rails having an upwardly facing, horizontally extending supporting surface;

means for mounting the supporting rails in spaced, horizontally extending positions atop a vehicle;

a plurality of spaced, elongated movable rails of generally channel shape and U-shaped in cross-section, each movably mounted on one of said supporting rails with the open side of the channel facing downwardly over said upwardly facing horizontally extending supporting surfaces of the fixed supporting rails, said movable rails being mounted for horizontal movement on said supporting rails;

a roller mounted in each of said channel rails and rollingly contacting the upwardly facing, horizontally extending surface of the one of said supporting rails upon which the respective movable rail is movably mounted, said roller being mounted in the respective movable rail so that, when said roller bears against the upwardly facing surface of the respective supporting rail, the web portion of the channelshaped movable rail is spaced upwardly from said fixed supporting rail;

a chain and sprocket assembly connected to each of said movable rails and each including:

a chain in tension having its opposite ends connected to the respective movable rail at two points spaced horizontally therealong, with one of said points located between the other of said points and said roller;

a sprocket drivingly engaging the chain intermediate its length at a location displaced and spaced from an end of the respective supporting rail upon which said movable rail is mounted and being disposed below the longitudinal axis of the respective fixed supporting rail;

idler sprocket roller means supporting the chain at a location displaced and spaced from said one end of said respective fixed supporting rail with said chain being supported by said idler sprocket roller means to extend in a substantially linear path between said two points except at the location where said chain extends around said sprocket, said linear path extending parallel to the respective movable rail in the space within the channel shape of said movable rail and above the upwardly facing, horizontally extending supporting surface of the respective supporting rail;

means rotatably supporting the sprocket and idler sprocket roller means; and means for pivotally connecting said means rotatably supporting the sprocket and idler sprocket roller means at one side of a vehicle to facilitate pivotation of the respective chain and sprocket assembly and its respective movable rail about a horizontal axis which is at all times stationary with respect to said vehicle, and with respect to said fixed supporting rails.

* * * * *